(12) United States Patent
Dominka

(10) Patent No.: US 6,793,480 B2
(45) Date of Patent: Sep. 21, 2004

(54) SHUTOFF VALVE ASSEMBLY

(76) Inventor: John Dominka, 36425 Maas Dr., Sterling Heights, MI (US) 48312

( * ) Notice: Subject to any disclaimer, the term of this patent is extended or adjusted under 35 U.S.C. 154(b) by 0 days.

(21) Appl. No.: 10/187,685

(22) Filed: Jul. 1, 2002

(65) Prior Publication Data
US 2004/0001900 A1 Jan. 1, 2004

(51) Int. Cl.[7] .............................................. B29C 45/23
(52) U.S. Cl. ........................................ 425/563; 425/572
(58) Field of Search ........................... 425/563; 264/572

(56) References Cited

U.S. PATENT DOCUMENTS

| 3,295,169 A | 1/1967 | Moslo |
| 3,491,408 A | 1/1970 | Natkins |
| 3,608,150 A * | 9/1971 | Laufer et al. ............... 425/563 |
| 3,915,610 A | 10/1975 | Kohler |
| 4,010,903 A | 3/1977 | Sakuri et al. |
| 4,333,608 A | 6/1982 | Hendry |
| 4,427,361 A | 1/1984 | Saito |
| 4,652,230 A | 3/1987 | Osuna-Diaz |
| 4,787,840 A | 11/1988 | Gellert |
| 4,909,724 A | 3/1990 | Sonoda et al. |
| 4,942,006 A | 7/1990 | Loren |
| 5,017,127 A | 5/1991 | Majerus et al. |
| 5,273,417 A | 12/1993 | Nelson |
| 5,441,400 A | 8/1995 | Zeiger |

* cited by examiner

*Primary Examiner*—Tim Heitbrink
(74) *Attorney, Agent, or Firm*—VanOphem & VanOphem, P.C.

(57) ABSTRACT

A shutoff nozzle and valve assembly for gas-assisted injection molding having a nozzle body, a shutoff pin, a helical spring, a spring guide and a gas-injection valve assembly. The shutoff nozzle and valve assembly is a simple design including minimal components, thereby resulting in ease of maintenance and reduced cost. The nozzle assembly is self-actuating, using direct resin pressure to open the valve thereby enabling the flow of molten resin through the nozzle and into a mold cavity. After injection of the molten resin, the helical spring automatically engages the shutoff pin thereby closing the nozzle and valve assembly to prevent backflow. The gas-injection valve assembly is similarly self-actuating such that minimal operator supervision is required to operate the nozzle assembly.

6 Claims, 3 Drawing Sheets

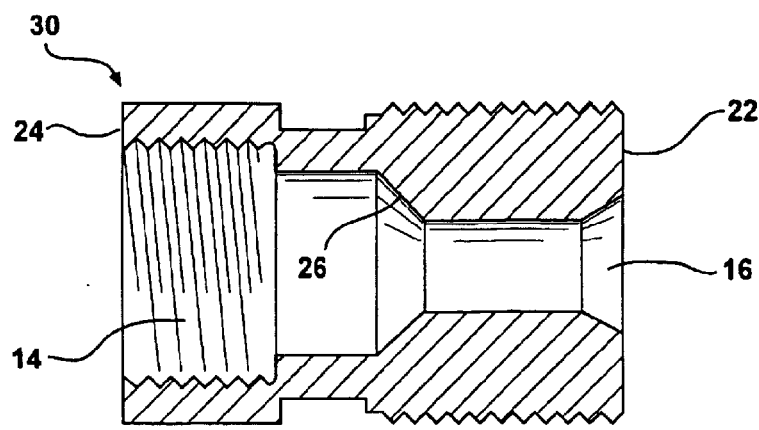
FIG - 3
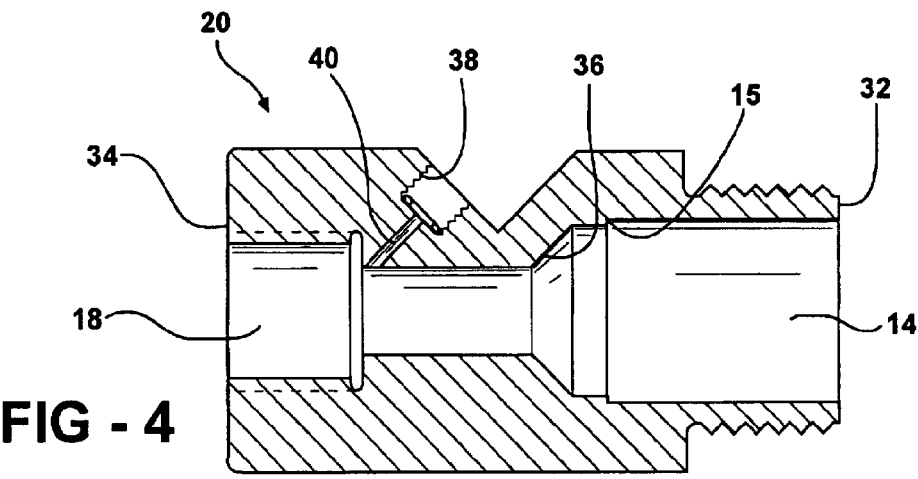
FIG - 4
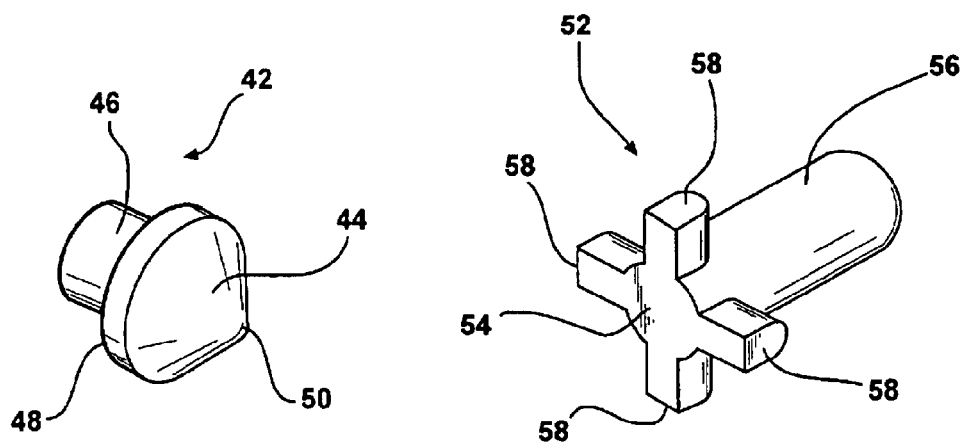
FIG - 5      FIG - 6

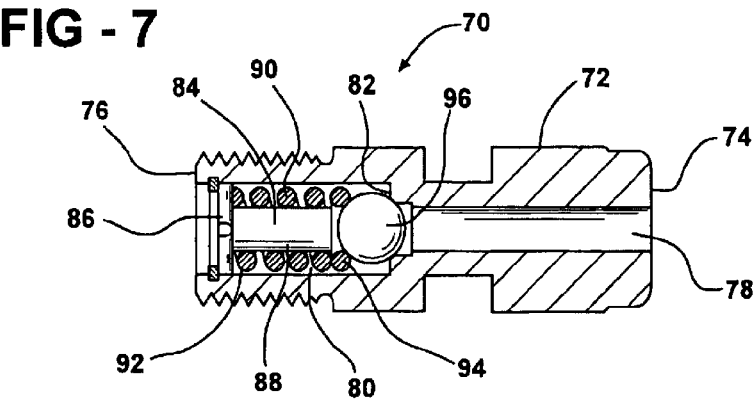
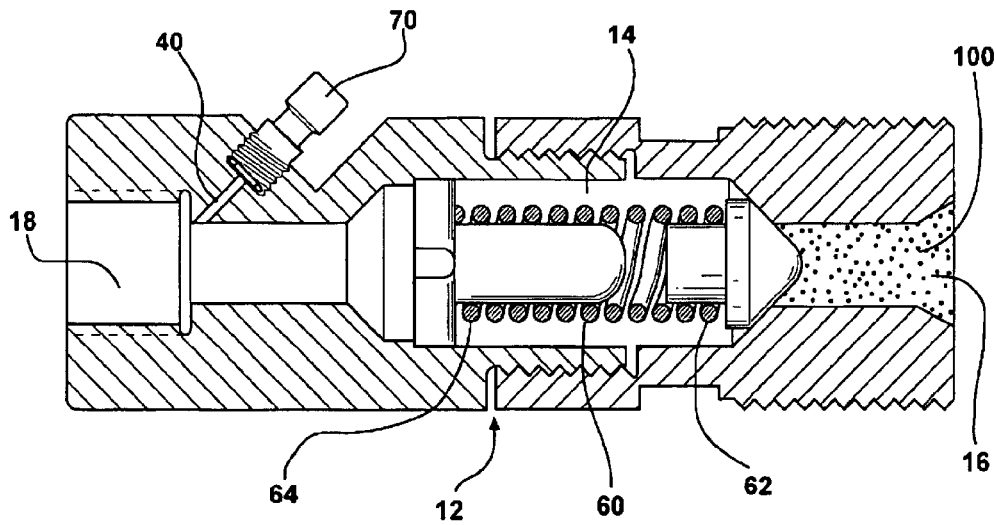
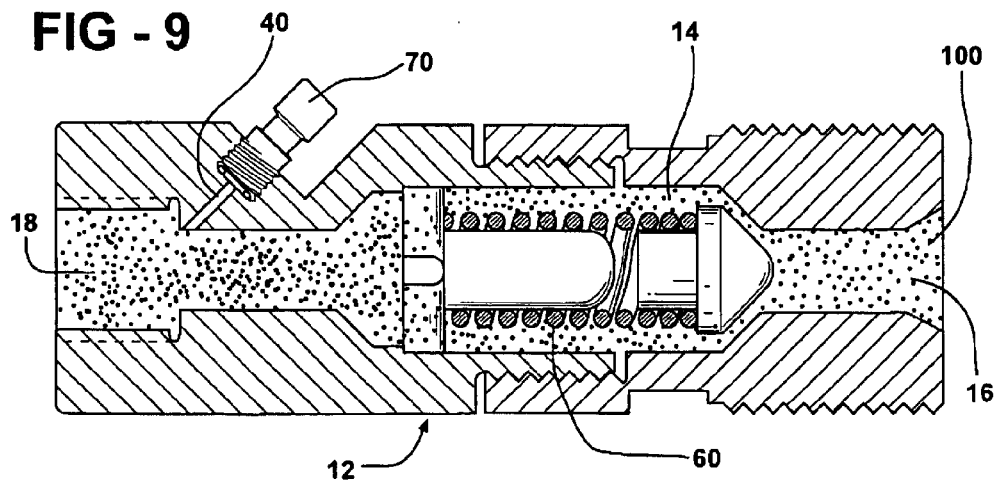

SHUTOFF VALVE ASSEMBLY

BACKGROUND OF THE INVENTION

1. Field of the Invention

The present invention relates generally to a valve apparatus for gas-assisted injection molding. More particularly, the present invention relates to a fluid assisted shutoff nozzle valve.

2. Description of the Prior Art

The use of pressurized gas to assist in injection molding of resinous material is known in the art. It is important in injection molding processes to control the flow of the resinous material while minimizing the back flow of the resinous material from the molded article.

U.S. Pat. No. 3,295,169 to Moslo discloses a spring pressed shutoff for an injection nozzle for use in connection with a plastic injection molding machine. The nozzle of the Moslo invention includes a hollow elongated body that is open at the rear end and closed at the forward end except for a small discharge opening. The body has a generally cylindrical internal diameter for the major portion of its length except at the forward end where it tapers in generally conical shape toward the discharge opening.

A shutoff pin is slidably mounted in the hollow body. This pin has a nose adapted to close the discharge opening. A helical spring is provided biasing the pin toward its closed position. The shutoff pin includes a central passageway and a plurality of diverging passageways in fluid communication with the central passageway. The plurality of diverging passageways are evenly spaced about the central axis of the shutoff pin so the pressure in the passageways will balance in a radial direction and the shutoff pin will slide easily in the nozzle body. A discharge pocket is defined in an area between the forward end of the nozzle body and the nose portion of the shutoff pin.

When the injection material under pressure is forced through the passageways and into the discharge pocket at the start of an injection operation, pressure will build against an effective area at the forward end of the nozzle body to overcome the pressure against an effective area at the rear end of the nozzle body, thereby causing rearward movement of the pin which overcomes the bias and compresses the helical spring. This will open the nozzle so that the melt or injection material will pass through the discharge pocket into a mold cavity downstream of the nozzle body. As soon as the molding operation ceases, the spring will again bias the shutoff pin forwardly so that the nose of the pin will close the discharge opening.

The Moslo disclosure relies on differential pressure to begin actuation of the injection nozzle after overcoming the bias of the helical spring for the shutoff. The reliance on differential pressure actuation taught by Moslo necessitates a complex design with a system of passageways and cavities such that the pressure is properly balanced and does not restrict the motion of the shutoff pin. Furthermore, regulation of the proper pressure differential is a delicate process in which a slight pressure imbalance can result in premature shutoff or backflow. Finally, the Moslo disclosure is not adapted to accommodate a valve for the introduction of gas in a gas-assisted injection-molding operation.

U.S. Pat. No. 4,010,903 to Sakuri et al., discloses a plug-in type nozzle with a valve gate for molding of thermoplastic materials. The nozzle of the Sakuri et al. disclosure includes a cylinder, a differential moving piston and a spring.

The interior of the cylinder forms a cylindrical piston chamber. An inlet is provided through the rear end of the cylinder, and is connected to a conventional molding machine. A gate is provided in the front end of the cylinder along the axis of the cylinder, and is connected to a mold cavity. A front portion of the piston chamber and a rear portion of the piston chamber are interconnected with a passage.

The differential moving piston is disposed in the piston chamber slidably in the axial direction of the cylinder. The differential moving piston includes a front piston, a rear piston and a piston rod. A needle protrudes forward from the front end of the front piston. When the differential moving piston is in the front position, the needle couples with the gate and when the differential moving piston is in the rear position, the needle is apart from the gate. The spring is disposed in the rear portion of the piston chamber pressing the rear end of the rear piston forward.

Molten resin is introduced from a connected molding machine flows through the gate, fills the rear portion of the piston chamber, the passage, and the front portion of the piston chamber. When the pressure of molten resin exceeds a predetermined value, the excess pressure generates reversely directed forces acting on the differential moving piston to slide the piston backward against the forward biased spring. As a result, the gate opens automatically to inject the resin in the piston chamber to the mold cavity. When the pressure of the molten resin decreases, the gate closes automatically The Sakuri et al. disclosure is similar to the Moslo disclosure in that both rely on differential pressure to actuate the injection nozzle, and a spring for the shutoff. Therefore, Sakuri et al. has many of the disadvantages inherent in the differential pressure systems discussed in reference to Moslo. Specifically, regulation of the proper pressure differential is a delicate process requiring very tight tolerances on the associated parts. Furthermore, a slight pressure imbalance in a differential pressure system can result in premature shutoff or backflow. Again as in Moslo, the Sakuri et al. disclosure is not adapted to accommodate a valve for the introduction of gas in a gas-assisted injection-molding operation.

U.S. Pat. No. 5,273,417 to Nelson discloses an injection nozzle for gas assisted injection molding. The nozzle of the present invention contains a separate gas entry passageway with a check valve for injection of the gas into the molten plastic stream and a separate gas exit passageway containing a movable pin or arm for venting the gas back through the plastic passageway in the nozzle.

The check valve in the gas entry passageway allows pressurized gas to be injected into the plastic material in the mold cavity but prevents gas from passing back through the gas entry passageway.

The movable pin in the gas exit passageway travels from a first or closed position to a second or open position. The movable pin is normally maintained in the closed position during injection of both the molten plastic and the pressurized gas, such that neither pressurized gas or plastic can enter the gas exit passageway. Once the plastic article has cooled sufficiently to be self-supporting, the movable pin is moved to the open position whereby the gas is allowed to vent.

In the closed position, the end or tip of the movable pin provides support for the thin layer of plastic covering the gas exit passageway. In the open position, however, the support for the thin layer of plastic is effectively removed. Therefore, upon moving the pin to the open position, the pressurized gas punctures the thin, unsupported layer of plastic covering the gas exit passageway and then vents to atmosphere.

The injection nozzle disclosed in Nelson does not include an automatic plunger or piston valve system. Nelson teaches a "push-push" or "push-pull" plastic shutoff valve that must be coordinated with each injection operation. Actuation of the plastic shutoff valve is mechanical and requires additional means for providing power, thereby adding cost and complexity to the apparatus as compared to an automatic system. Furthermore, the potential for failure of an injection operation resulting from improper actuation and/or timing of the plastic shutoff valve is introduced into the system taught by Nelson.

Finally, Nelson does not teach a means for maintaining the check valve in the closed position in the absence of pressure. Therefore, it is possible that during an injection operation, the check valve will improperly seat thereby permitting molten plastic to flow into and plug the gas entry passageway.

U.S. Pat. No. 3,491,408 to Natkins, discloses a valve adjuster and stop mechanism for an injection molding machine. In the design of Natkins, multiple valves can be opened in response to the pressure of the mold substance forcing the valve open. This design biases the valves in a closed position utilizing Belleville spring washers, but does not provide a check valve or material back flow device.

U.S. Pat. No. 4,909,724 to Sonoda et al. discloses an injection apparatus having a motorized internal plunger with a grooved check valve for preventing a back flow of material from the molded article into the apparatus; however, this device does not provide a gas injection means.

U.S. Pat. No. 4,333,608 to Hendry discloses an injection molding nozzle. The nozzle uses an internal plunger, regulated by a control rod, to adjust the position of the plunger and control the flow of plasticized material. The tip of the plunger is also used as a shut-off valve by slidably communicating the nozzle of the tip to inhibit the flow of resinous material. This design uses resin pressure to articulate the plunger but is biased by the control rod and is fluid operated.

As can be seen from the above discussion of the prior art, what is needed is a self-actuating nozzle apparatus that operates in response to pressure from the injection of plastic resin to open, incorporates an automatic device to hold closed, that is of simple construction with few components, and that incorporates a gas injection port with a one way valve to facilitate gas-assisted injection molding operation.

SUMMARY OF THE INVENTION

The present invention is directed toward an improved shut-off nozzle and apparatus for gas-assisted injection molding that automatically opens and closes a resin injection flow valve in direct response to the flow of plastic resin. The disclosed shutoff nozzle assembly includes a nozzle body, a shutoff pin, a spring, a spring guide member, and a gas injection valve. In this description, the words "front" and "rear" are defined according to the flow direction of molten resin.

The nozzle body is generally cylindrical and preferably includes an upstream portion detachably connected to a downstream portion. A rear end of the nozzle body is adapted for connection to a conventional molding machine and a front end of the nozzle body is adapted for connection to a mold cavity. The nozzle body further includes an internal central passageway that is restricted to form an inlet passage at the rear end and a discharge opening at the front end.

The downstream portion of the nozzle body includes a valve port, and a gas entry passageway connecting the valve port to the discharge opening. The gas-injection valve is connected to the valve port of the downstream portion of the nozzle body.

The shutoff pin includes a conical head portion and a shaft portion. The shutoff pin is slidably mounted within the central passageway of the nozzle body and oriented so that the conical head portion points rearwardly or opposite to the direction of the melt flow. The shutoff pin is configured such that only the tip of the conical head portion is insertable within the inlet passage, whereby the conical head portion closes off the inlet passage when urged rearwardly.

The spring guide member includes a base portion and a cylindrical shaft portion. The base portion is of sufficient effective diameter to prevent the spring guide from passing through the discharge opening. The base portion is disposed within the front portion of the central passageway, and the spring guide member is oriented so that the shaft portion extends rearwardly from the base portion.

The helical spring is confined within the central passageway, has a first end disposed about the shaft of the shutoff pin and a second end disposed about the shaft of the spring guide. The helical spring is configured to bias the shutoff pin rearward toward the inlet passage.

The gas-injection valve assembly preferably includes a valve housing, a ball bearing, a valve spring and a valve spring retainer. The valve housing has an inlet end connected to an injection gas source, and an outlet end connected to the nozzle body. The valve housing further has a gas passageway extending from the inlet end, a valve chamber extending from the outlet end, and an internal shoulder portion defined at an intersection of the gas passageway and the valve chamber. The diameter of the valve chamber is greater than the diameter of the gas passageway.

The valve spring retainer includes a base portion and a shaft portion. The base portion of the valve spring retainer is disposed within the valve chamber, is fixed near the outlet end of the valve housing, and is oriented so that the shaft portion extends within the valve chamber. The valve spring has a first end disposed about the shaft portion of the valve spring retainer and a second end in contact with the ball bearing. The ball bearing has a diameter less than the diameter of the valve chamber, but greater than the diameter of the gas passageway. The valve spring is configured to urge the ball bearing against the internal shoulder portion or valve seat of the valve housing to close the gas passageway.

The injection of high-pressure gas into the valve assembly during a gas-injection molding process applies sufficient force to the ball bearing to overcome the valve spring force, thereby sliding the ball bearing away from the internal shoulder portion of the valve housing and opening the gas passageway. In this manner, the gas is injected into the gas inlet passage of the nozzle housing, through the discharge opening and into the mold cavity. When the flow of injected gas is discontinued, the spring forces the ball bearing back into contact with the internal shoulder portion of the valve housing to close the gas passageway.

The nozzle and valve assembly of the present invention uses direct resin pressure to overcome the helical spring force and open the inlet passage. When the flow of molten resin is discontinued, the helical spring returns the shutoff pin to block the inlet passage to the closed position to seal the valve and prevent back flow. The high-pressure gas injected into the valve assembly applies additional rearward force to the shutoff pin that assists the helical spring in maintaining the inlet passage in the closed position. The helical spring and the shutoff pin are the only moving parts in the nozzle body, resulting in ease of maintenance.

Accordingly, it is an object of this invention to provide a self-actuating nozzle assembly that eliminates the need of an hydraulic, pneumatic or electric actuator.

It is a further object of the invention to provide a self-actuating nozzle assembly that operates on plastic resin pressure to open and utilizes a spring to hold closed.

It is a still further object of the invention to provide a self-actuating nozzle assembly that is of simple construction with few moving parts.

It is another object of the invention to provide a self-actuating nozzle assembly that is reliable and requires minimal operator supervision.

It is yet another object of the invention to provide a self-actuating nozzle that utilizes the gas pressure to assist in holding the resin valve closed and thereby prevent back flow.

It is still another object of the invention to provide a self-actuating nozzle that is economical, easy to manufacture and assemble, and that is safe and effective in releasing pressure from the molded article.

For a more complete understanding of the nozzle apparatus of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 3 is a sectional view of a downstream portion of the nozzle assembly of FIG. 1;

FIG. 4 is a sectional view of a upstream portion of the nozzle assembly of FIG. 1;

FIG. 5 is an isometric view of a shutoff pin of the nozzle assembly of FIG. 1;

FIG. 6 is an isometric view of a spring guide member of the nozzle assembly of FIG. 1;

FIG. 7 is a sectional view of a gas-injection valve assembly of the nozzle assembly of FIG. 1;

FIG. 8 is a sectional view of the nozzle assembly of FIG. 1 illustrating the flow of molten resin into the nozzle assembly; and FIG. 9 is a sectional view of the nozzle assembly of FIG. 1 illustrating the flow of molten resin through the nozzle assembly.

DETAILED DESCRIPTION OF THE PREFERRED EMBODIMENTS

Figure 1:
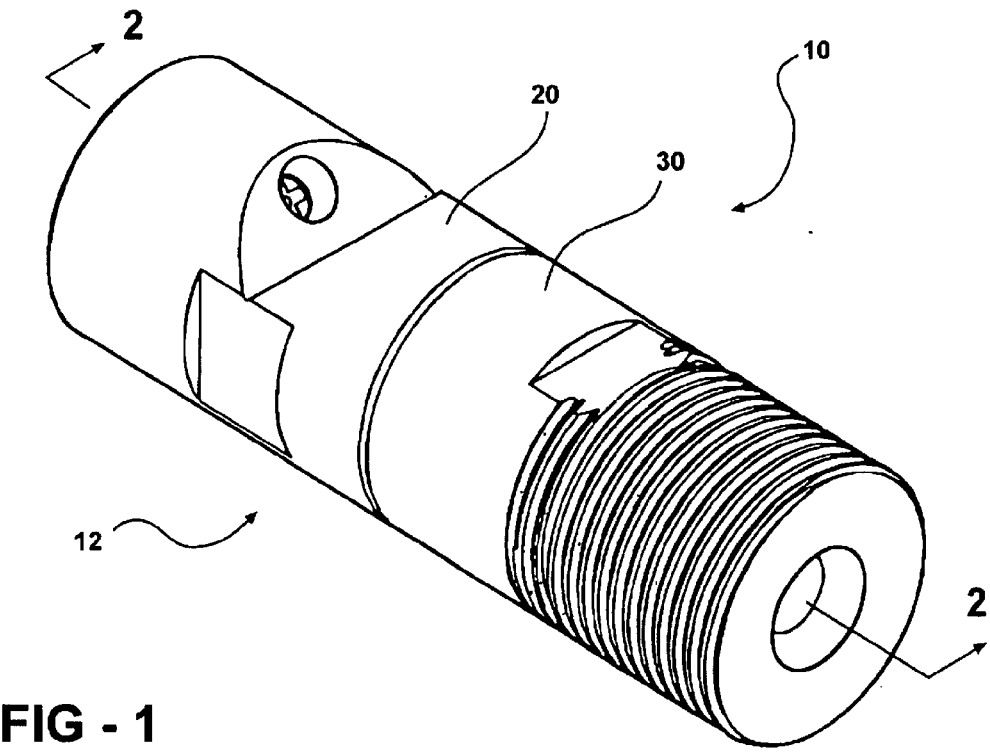
FIG. 1 is an isometric view of the preferred embodiment of the nozzle assembly of the present invention.
Figure 2:
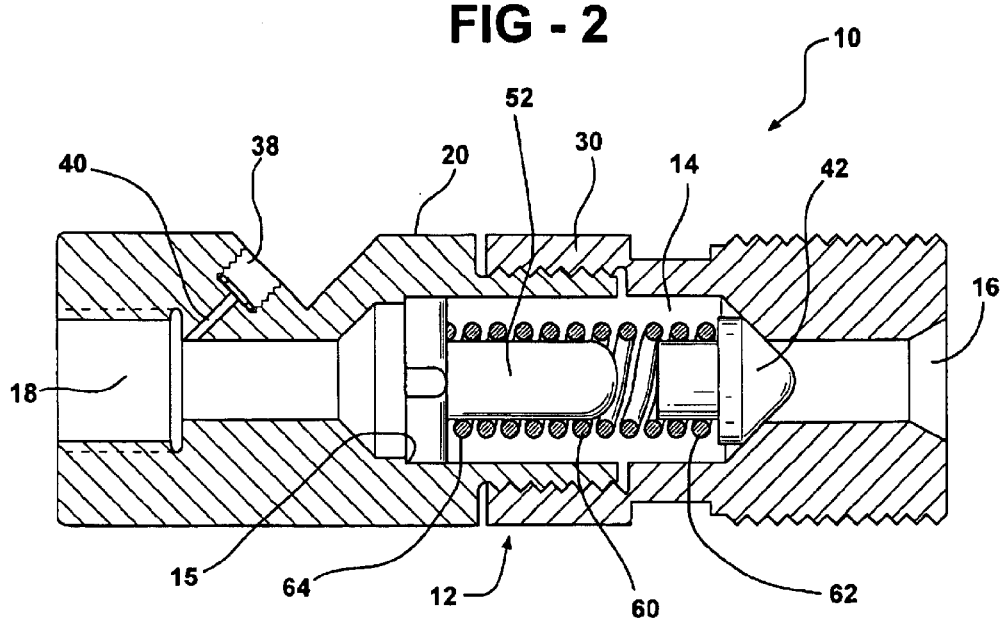
FIG. 2 is a sectional view of the nozzle assembly of FIG. 1.

Referring now to the drawings, there is shown in FIGS. 1 and 2 a preferred embodiment of a shutoff nozzle and valve assembly 10 according to the present invention. The shutoff nozzle and valve assembly 10 includes a nozzle body 12, a shutoff pin 42, a spring guide member 52, a helical spring 60, and a gas-injection valve assembly 70. In this description, the words "front" and "rear" are defined according to the flow direction of molten resin.

The nozzle body 12 is generally cylindrical and preferably includes an upstream portion 20 detachably connected to a downstream portion 30. The upstream portion is preferably female and threaded onto the male downstream portion. The nozzle body 12 further includes a central passageway 14, an inlet passage 16 and a discharge opening 18.

Referring to FIG. 3, the upstream portion 20 of the nozzle body 12 has an inlet end 22 and an outlet end 24. The outlet end 24 is open defining a rear portion of the central passageway 14. The inlet end 22 is restricted thereby forming the inlet passage 16, the internal diameter of the inlet passage 16 being smaller than the internal diameter of the central passageway 14. An internal tapered transition 26 connects the central passageway 14 and the inlet passage 16. The inlet end 22 of the upstream portion 20 of the nozzle body 12 is adapted to establish a connection between the inlet passage 16 and a conventional molding machine (not shown).

Referring to FIG. 4, the downstream portion 30 of the nozzle body 12 has an inlet end 32 and an outlet end 34. The inlet end 32 of the downstream portion 30 is open defining a front portion of the central passageway 14. The outlet end 34 of the downstream portion 30 is restricted thereby forming the discharge opening 18, the internal diameter of the discharge opening 18 being smaller than the internal diameter of the central passageway 14. An internal tapered transition 36 connects the central passageway 14 and the discharge opening 18. The downstream portion 30 of the nozzle body 12 includes a valve port 38, and a gas entry passageway 40 connecting the valve port 38 to the discharge opening 18. The gas entry passageway 40 is preferably cylindrical with a diameter in the range of 0.06 to 0.156 inches, however, other configurations can be envisioned and the preferred embodiment disclosed herein should not be considered limiting. The gas-injection valve assembly 70 is detachably connected to the valve port 38 of the downstream portion 30 of the nozzle body 12. The outlet end 34 of the downstream portion 30 of the nozzle body 12 is adapted to establish a connection between the discharge opening 18 and a mold cavity (not shown).

Referring to FIG. 5, the shutoff pin 42 includes a head portion 44 and a shaft portion 46. The head portion 44 of the shutoff pin 42 is preferably conical, has a base end 48 and a tip end 50 opposite the base end 48. The diameter of the base end 48 of the head portion 44 is less than the diameter of the central passageway 14 to permit relative motion therethrough, and greater than the diameter of the inlet passage 16 to serve as a valve seal. The shutoff pin 42 is slidably mounted within the central passageway 14 of the nozzle body 12 whereby the tip end 50 of the head portion 44 points rearwardly. The degree of taper of the head portion 44 approximates the degree of taper of the internal tapered transition 26 of the upstream portion 20 such that the shutoff pin 42 creates a seal to shut off the inlet passage 16 when the head portion 44 is in contact with the internal tapered transition 26 of the upstream portion 20. Thus, the inlet passage 16 is in a closed condition when the shutoff pin 42 is in contact with the internal tapered transition 26 of the upstream portion 20, and the inlet passage 16 is in an open position when the shutoff pin 42 is not in contact with the internal tapered transition 26 of the upstream portion 20.

Referring to FIG. 6, the spring guide member 52 includes a base portion 54 and a shaft portion 56. The base portion 54 of the spring guide member 52 is of sufficient effective diameter to prevent the spring guide member 52 from passing through the discharge opening 18. In the preferred embodiment there is provided a shoulder 15 (shown in FIGS. 2 and 4) within the central passageway 14 against which the base portion 54 of the spring guide member 52 rests. Alternatively, the base portion 54 of the spring guide member 52 may rest directly on the internal tapered surface 36 of the downstream portion 30. The base portion 54 of the spring guide member 52 preferably includes four extensions 58 protruding radially from the centerline of the shaft portion 56 of the spring guide member 52, spaced approximately ninety degrees apart. However, it will be apparent to one of ordinary skill in the art that other base portion configurations will work equally well as long as they do not excessively restrict the flow of the molten resin. The spring guide member 52 is inserted within the front portion of the central passageway 14. The spring guide member 52 is oriented so that the protruding extensions 58 or the base portion 54 abuts the shoulder 15 in the central passageway 14, and the shaft portion 56 extends rearwardly from the base portion 54.

Although not essential for the operation of this invention, the helical spring (shown in FIG. 2) will be described in the context of the preferred embodiment. Other embodiments implementing alternate means for biasing the shutoff pin 42 against the internal tapered transition 26 of the upstream portion 20 to shut off the inlet passage 16 can be envisioned. The helical spring is confined within the central passageway 14, has a first end 62 disposed about the shaft portion 46 of the shutoff pin 42 and a second end 64 disposed about the shaft portion 56 of the spring guide member 52. The helical spring 60 is configured to bias the shutoff pin 42 rearward toward the internal tapered transition 26 of the upstream portion 20 of the nozzle body 12.

As seen in FIG. 7, the gas-injection valve assembly 70 preferably includes a valve housing 72, a valve spring retainer 84, a valve spring 90, and a ball bearing 96. The valve housing 72 has an inlet end 74 and an outlet end 76 opposite the inlet end 74. The inlet end 74 of the valve housing 72 is detachably connected to an injection gas source (not shown). The outlet end 76 of the valve housing 72 is adapted to facilitate attachment to the valve port 38 of the downstream portion 30 of the nozzle body 12 as shown in FIG. 2. In the preferred embodiment, the outlet end 76 of the valve housing 72 is externally threaded and the valve port 38 is internally threaded. The valve housing 72 further has a gas passageway 78 extending from the inlet end 74, a valve chamber 80 extending from the outlet end 76, and an internal shoulder or valve seat 82 defined at an intersection of the gas passageway 78 and the valve chamber 80. The diameter of the valve chamber 80 is greater than the diameter of the gas passageway 78.

The valve spring retainer 84 includes a base portion 86 and a shaft portion 88. The base portion 86 of the valve spring retainer 84 is disposed within the valve chamber 80, is fixed near the outlet end 76 of the valve housing 72, and is oriented so that the shaft portion 88 extends within the valve chamber 80. The base portion 86 of the valve spring retainer 84 preferably has multiple extensions (not shown) similar to the extensions 58 (shown in FIG. 6), such that the flow of gas through the valve chamber 80 is not restricted. The valve spring 90 has a first end 92 disposed about the shaft portion of the valve spring retainer 84 and a second end 94 in contact with the ball bearing 96. The valve spring 90 is configured to urge the ball bearing 96 against the internal shoulder 82 of the valve housing 72. The ball bearing 96 has a diameter less than the diameter of the valve chamber 80, but greater than the diameter of the gas passageway 78. The ball bearing 96 is slidably disposed within the valve chamber 80 between the second end 94 of the valve spring 90 and the internal shoulder 82 of the valve housing 72.

The injection of high-pressure gas into the gas-injection valve assembly 70 during a gas-injection molding process applies sufficient force to the ball bearing 96 to overcome the valve spring 90 force, thereby sliding the ball bearing 96 away from the internal shoulder 82 of the valve housing 72 and opening the gas passageway 78. In this manner, the gas is injected into the gas entry passageway 40 of the nozzle body 12, through the discharge opening 18 (shown in FIG. 2) and into the mold cavity (not shown). When the flow of injected gas is discontinued, the valve spring 90 forces the ball bearing 96 back into contact with the internal shoulder 82 of the valve housing 72 thereby closing the gas passageway 78 so that the injected gas and/or molten resin cannot escape through the gas passageway 78 during the molding process.

As seen in FIGS. 8 and 9, the shutoff nozzle and valve assembly 10 of the present invention uses direct resin pressure to overcome the biasing force of the helical spring 60 and open the inlet passage 16. When the flow of molten resin 100 is discontinued, the helical spring 60 acts on the shutoff pin 42 to seal the inlet passage 16 to the closed position to prevent back flow. The high-pressure gas injected into the gas-injection valve assembly 70 applies additional rearward force to the shutoff pin 42 that assists the helical spring 60 in maintaining the inlet passage 16 in the closed position. The helical spring 60 and the shutoff pin 42 are the only moving parts in the nozzle body 12, resulting in ease of maintenance.

As seen in FIG. 8, molten resin 100 from a conventional molding machine (not shown) is introduced into the inlet passage 16 that is initially in the closed position. Referring to FIG. 9, as sufficient pressure builds against the shutoff pin 42 to overcome the helical spring 60 bias, the inlet passage 16 opens thereby enabling the molten resin 100 to flow through the central passageway 14, out the discharge opening 18 and into the mold cavity (not shown). After sufficient molten resin 100 is introduced into the mold cavity (not shown), the melt flow is shut off and the inlet passage 16 automatically returns to the closed position as previously described. High-pressure gas is injected into the melt stream of the molten resin 100 through the gas-injection valve assembly 70 to maintain the inlet passage 16 in the closed position and to force the molten resin 100 forward into the mold (not shown). As is well known in the art of gas-assisted injection molding, the pressurized gas forms a cavity within the resin and expands outwardly such that a uniformly thin layer of plastic forms on the internal surface of the mold cavity (not shown).

It is evident that many alternatives, modifications, and variations of the nozzle assembly and method of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. A fluid-assisted nozzle assembly for injection molding, said nozzle assembly comprising:

a nozzle body having an upstream and a downstream portion; said nozzle body having a passageway extending therethrough from said upstream portion through said downstream portion;

a valve disposed in said passageway of said nozzle body, said passageway being sealed when said valve is in a first position and being open when said valve is in a second position;

a nozzle spring coaxially mounted with said valve and configured to bias said valve into said first position, whereby pressurized resinous material injected into said at least one passageway of said nozzle body overcomes bias of said nozzle spring thereby axially moving said valve from said first position to said second position as said resinous material flows through said at least one passageway, and said nozzle spring automatically returns said valve from said second position to said first position thereby closing said at least one passageway; and a fluid inlet disposed in said downstream portion of said nozzle body, said fluid inlet having an inlet port;

a fluid injection valve having a valve body with a gas passageway and a valve chamber extending therethrough;

a ball bearing disposed within said valve chamber; and a valve spring disposed within said valve chamber, said valve spring mounted adjacent said ball bearing to bias said ball bearing into engagement with said gas passageway to close said gas passageway.

2. The nozzle assembly as claimed in claim 1, wherein said passageway of said nozzle body comprises a central passageway, an inlet passage formed at said upstream portion of said nozzle body in fluid communication with said central passageway, and a discharge opening formed at said downstream portion of said nozzle body in fluid communication with said central passageway.

3. The nozzle assembly as claimed in claim 1, wherein said fluid injection valve opens in response to a high pressure fluid injected into said fluid injection valve, and said valve spring automatically closes said fluid injection valve.

4. The nozzle assembly as claimed in claim 1, wherein said upstream portion of said nozzle body is detachably connected to said downstream portion of said nozzle body.

5. A fluid-assisted nozzle assembly for injection molding, said nozzle assembly comprising:

a nozzle body having an upstream portion, a downstream portion detachably connected to said upstream portion, a central passageway disposed within said nozzle body, an inlet passage formed at said upstream portion in fluid communication with said central passageway, and a discharge opening formed at said downstream portion in fluid communication with said central passageway;

a valve disposed within said central passageway of said nozzle body, said inlet passage being sealed when said valve is in a first position and being open when said valve is in a second position;

a nozzle spring coaxially mounted with said valve and configured to bias said valve into said first position, whereby pressurized resinous material injected into said inlet passage of said nozzle body overcomes bias of said nozzle spring thereby axially moving said valve from said first position to said second position as said resinous material flows through said central passageway, and said nozzle spring automatically returns said valve from said second position to said first position thereby closing said inlet passage;

a fluid inlet disposed in said downstream portion of said nozzle body, said fluid inlet having an inlet port;

a fluid injection valve having a valve body with a gas passageway and a valve chamber extending therethrough;

a ball bearing disposed within said valve chamber; and a valve spring disposed within said valve chamber, said valve spring mounted adjacent said ball bearing to bias said ball bearing into engagement with said gas passageway to close said gas passageway.

6. The nozzle assembly as claimed in claim 5, wherein said fluid injection valve opens in response to a high pressure fluid injected into said fluid injection valve, and said valve spring automatically closes said fluid injection valve.

* * * * *